United States Patent [19]
Fletcher et al.

[11] 3,978,417
[45] Aug. 31, 1976

[54] REFLECTED-WAVE MASER

[76] Inventors: James C. Fletcher, Administrator of the National Aeronautics and Space Administration, with respect to an invention of; Robert C. Clauss, La Crescenta, Calif.

[22] Filed: Feb. 12, 1975

[21] Appl. No.: 549,418

[52] U.S. Cl. .................................... 330/4; 331/94
[51] Int. Cl.[2] ...................... H01S 1/00; H01S 1/02
[58] Field of Search ................... 331/94; 330/4, 4.1, 330/4.8

[56] References Cited
UNITED STATES PATENTS

| | | | |
|---|---|---|---|
| 3,064,201 | 11/1962 | Damon .................................. | 330/4 |
| 3,076,148 | 1/1963 | Schulz-Dubois et al. ............... | 330/4 |
| 3,135,925 | 6/1964 | Goodwin et al. ....................... | 330/4 |
| 3,299,364 | 1/1967 | Buchmiller et al. .................... | 330/4 |
| 3,729,689 | 4/1973 | Godard et al. ....................... | 331/94.5 |

OTHER PUBLICATIONS

Okwit et al., "Packaged . . . Traveling Wave Maser System", June 1962, pp. 1470–1483, Proceedings of the IRR.
Clauss, "Two Cavity Maser for Planetary Radar", May 1965, pp. 74–77, The Microwave Journal.
Tabor et al., "Masers for the Telstar Satellite . . . ", July 1963, pp. 1863–1886, Bell Tech. Systems Journal.

Primary Examiner—Nelson Moskowitz
Attorney, Agent, or Firm—Monte F. Mott; Paul F. McCaul; John R. Manning

[57] ABSTRACT

A number of traveling-wave, slow-wave maser structures, containing active maser material but absent the typical ferrite isolators, are immersed in a nonuniform magnetic field. The microwave signal to be amplified is inserted at a circulator which directs the signal to a slow-wave structure. The signal travels through the slow-wave structure, being amplified according to the distance traveled. The end of the slow-wave structure farthest from the circulator is arranged to be a point of maximum reflection of the signal traveling through the slow-wave structure. As a consequence, the signal to be amplified traverses the slow-wave structure again, in the opposite direction (towards the circulator) experiencing amplification equivalent to that achieved by a conventional traveling-wave maser having twice the length. The circulator directs the amplified signal to following like stages of amplification. Isolators are used in between stages to prevent signals from traveling in the wrong direction, between the stages. Because ferrite isolators are not used in the slow-wave structures, reduced signal loss is experienced at each stage. The high gain produced by each slow-wave structure is reduced to a moderate value by use of a nonuniform magnetic field which also broadens the line width of the maser material. The resulting bandwidth can be exceptionally wide. A plurality of such cascaded stages provides high gain, exceptionally wide bandwidth and very low noise temperature.

22 Claims, 9 Drawing Figures

CHARACTERISTICS OF PRIOR ART MASER SYSTEMS

| TUNING RANGE (GHz) | TYPICAL NET GAIN (dB) | BANDWIDTH (MHz) | TWM NOISE TEMP. (KELVIN) | REFRIG TEMP (KELVIN) | MASER MATERIAL | REF |
|---|---|---|---|---|---|---|
| .96 – 1.13 | 30 | 3.5 | 4.0 | 2.0 | CHROMIUM DOPED RUTILE | I |
| 1.7 – 1.9 | 32 | 4.5 | 4.0 | 4.5 | " | I |
| 2.26 – 2.31 | 45 | 45 | 4.2 | 4.5 | RUBY | II |
| 2.24 – 2.24 | 40 | 10 | 4.2 | 4.5 | RUBY | II |
| 3.1 – 3.6 | 30 | 12 | 6.0 | 2.0 | CHROMIUM DOPED RUTILE | I |
| 5.0 – 5.1 | 29 | 100 | NOT KNOWN | 4.2 | RUBY | III |
| 5.25 – 6.1 | 24 | 20 | 8.0 | 4.2 | IRON DOPED RUTILE | I |
| 7.5 – 8.2 | 25 | 20 | NOT KNOWN | 1.7 | " | I |
| 7.6 – 8.9 | 40 | 17 | 20 | 4.5 | RUBY | II |
| 14.3 – 16.3 | 40 | 17 | 85 | 4.5 | RUBY | II |
| 36.5 – 37.5 | 25 | 20 | 40 | 4.2 | RUBY | IV |
| 35.4 – 40 | 20 | 15 | 20 | 1.7 | CHROMIUM DOPED RUTILE | V |

FIG. 1

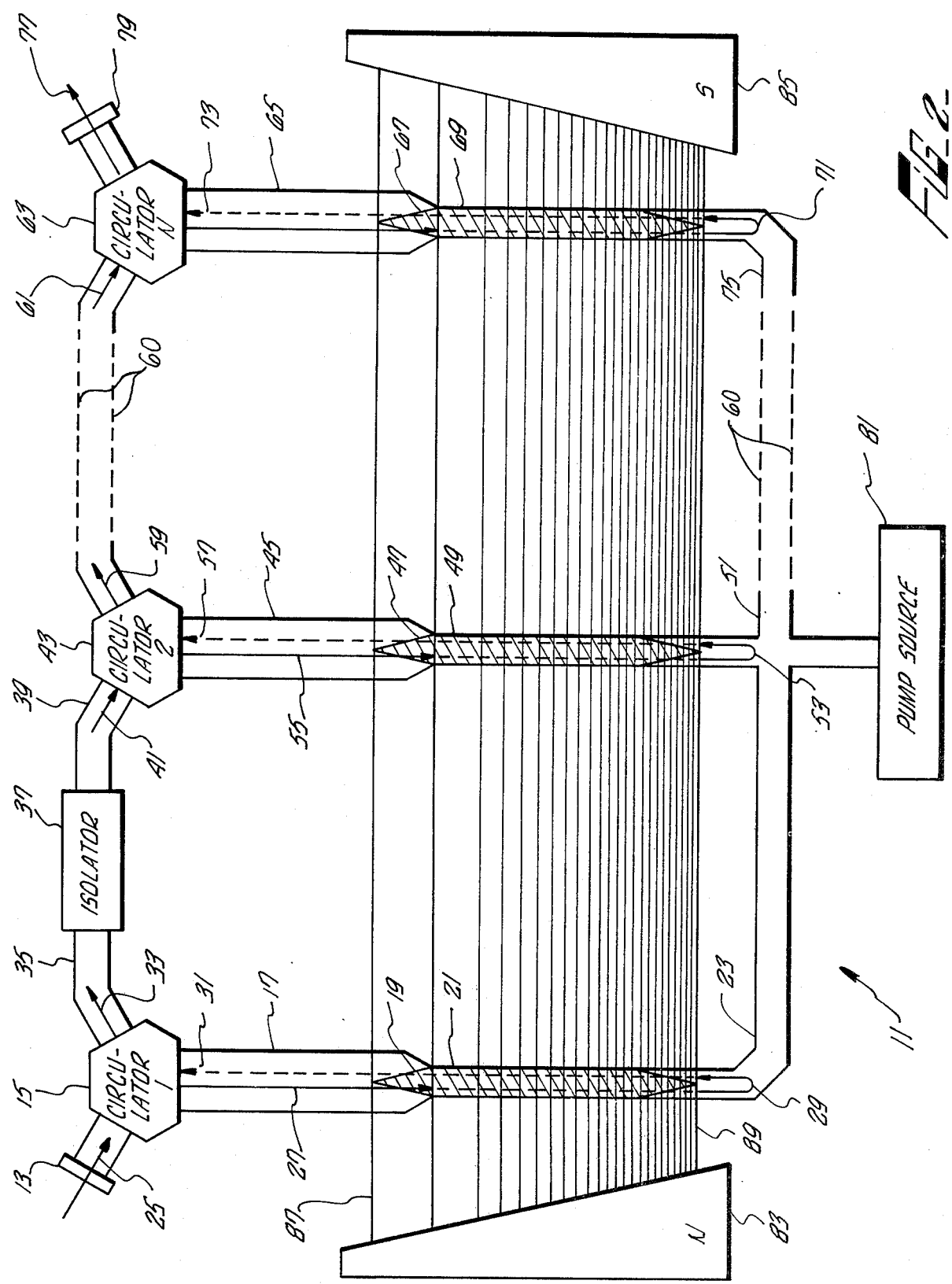

3,978,417

REFLECTED-WAVE MASER

BACKGROUND OF THE INVENTION

Origin of the Invention

The invention described herein was made in the performance of work under a NASA Contract and is subject to the provisions of Section 305 of the National Aeronautics and Space Act of 1958 Public Law 85-568 (72 STAT. 435; 42 USC 2457).

Field of the Invention

This invention generally relates to maser amplifiers. More particularly, the present invention is concerned with a reflected-wave maser using slow-wave structures operating in a nonuniform magnetic field.

Description of the Prior Art

The use of masers as low noise amplifiers is well known. Traveling-wave masers using slow-wave structures with active maser material (to provide amplification) and with ferrite material (to provide isolation) are described in the literature and in many U.S. patents. Examples of U.S. patents which describe prior maser technology are patents having numbers: U.S. Pat. Nos. 3,214,701; 3,296,541; 3,299,364; 2,486,123; and 3,676,787.

Traditionally, maser amplifiers exhibit very low noise temperatures and narrow bandwidth. The instantaneous bandwidth of a maser is determined primarily by the resonant linewidth of the maser material. The half-power bandwidth ($\Delta f$) of a traveling-wave maser (TWM) operating in a uniform magnetic field is:

$$\Delta f = \Delta f_L \left[ \frac{3}{G_{dB}(f_o)-3} \right]^{1/2} \qquad (1)$$

where:

$\Delta f_L$ = bandwidth of the magnetic resonance line of the active maser material $G_{dB}(f_o)$ = power gain in decibels at the magnetic resonant frequency The above equation [1], and a complete discussion of prior art techniques for increasing TWM bandwidth, can be found in *Microwave Solid State Masers by A. E. Siegman*, published by McGraw-Hill in 1964 and having Library of Congress Catalog Card Number 63-12131, particular attention being directed to pages 315 and 326 through 331.

Increasing TWM bandwidth, regardless of the techniques used, always causes a substantial reduction of gain. Since the sensitivity (the equivalent input noise temperature) of a TWM is related to the ratio of the loss coefficient for the slow-wave structure to the gain coefficient the sensitivity or noise temperature of a TWM may be severely degraded by attempts to broaden the bandwidth.

Generally speaking, prior art traveling-wave masers which obtain performance characteristics suitable for practical use have the following characteristics, requirements, and/or limitations:

1. Traveling-wave masers must be operated at cryogenic temperatures. Usually cooling to between 4 and 5 Kelvin is adequate; some masers must be operated at temperatures below 2 Kelvin to obtain satisfactory results.
2. A magnetic field is required. The field must be uniform to within ± 0.002 tesla (± 20 gauss) and at an intensity determined by the desired frequency, maser material, and orientation of the field with respect to the maser material crystallographic axes.
3. One or more sources of pumping energy must be used to produce a population inversion in the energy level system of the maser material. Typical sources used include klystrons, backward wave oscillators, gunn, and impatt devices.
4. A slow-wave structure of some type must be used to provide a sufficiently long interaction time between the signal to be amplified and the active maser material. Amplification increases exponentially with respect to the length traveled in a slow-wave structure.
5. Slow-wave structures with high slowing factors, to produce high gain, inherently have a narrow bandpass or are physically very long. The slow-wave structure bandpass limits the maser tuning range, but is usually much wider than the instantaneous bandwidth of the maser.

The performance of prior art masers has been described in literature. A summary of the important characteristics of prior art maser systems is shown in the table of FIG. 1. The reference numerals under the "REF" column of the table refer to the following publications:

[I] E. L. Kollberg, "A Traveling-Wave Maser System for Radio Astronomy," Proceedings of the IEEE, Vol. 61, No. 9, pp. 1323–1329, Sept. 1973.

[II] M. S. Reid, et al., "Low Noise Microwave Receiving Systems in Worldwide Network of Large Antennas," Proceedings of the IEEE, Vol. 61, No. 9, pp. 1330–1335, Sept. 1973.

[III] W. J. Tabor, "A 100-Mc Broad-Band Ruby Traveling-Wave Maser at 5 Gc," Proceedings of the IEEE, Vol. 51, No. 8, pg 1143, August 1963.

[IV] V. I. Zagatin, et al., "Radiometer for Spectral Measurements in the 8-mm Range with a Quantum Paramagnetic Amplifier," Instruments and Experimental Techniques, pp. 1137–1140, Sept.–Oct. 1968.

[V] F. R. Arams and B. J. Peyton, "Eight-Millimeter Traveling-Wave Maser and Maser-Radiometer System," Proceedings of the IEEE, Vol. 53, No. 1, pp. 12–23, Jan. 1965.

In spite of considerable effort in the maser area, the need for a low noise maser amplifier with wide instantaneous bandwidth (several hundred MHz) and high net gain has not, until the present invention been satisfied.

OBJECTS AND SUMMARY OF THE INVENTION

An object of this invention is to provide a two direction reflected-wave maser that exhibits more net gain and wider instantaneous bandwidth than is possible with prior art traveling-wave masers having twice the length of active maser material.

Another object of this invention is to provide a reflected-wave maser that exhibits low noise qualities across an exceptionally wide bandwidth and is comparable to the noise performance of narrow bandwidth prior art masers.

These objects and the general purpose of this invention are accomplished by reflecting a traveling-wave back through a slow-wave structure, effectively doubling its length, while maintaining the slow-wave structure in a nonuniform magnetic field to increase the linewidth of the active maser material. Signals to be amplified are directed to, and after amplification, directed from the reflection type slow-wave structure by a circulator. Cascading these reflection type slow-wave structures increases the overall gain. Isolators are used between the circulators of each stage to prevent signals from traveling from output stages to the input stage and causing feedback.

BRIEF DESCRIPTION OF THE DRAWINGS

The exact nature of this invention as well as other objects and advantages thereof will be readily apparent from consideration of the following specification related to the annexed drawings in which like reference numerals designate like parts throughout the figures thereof and wherein:

FIG. 1 is a table indicating the characteristics of various prior art masers.

FIG. 2 is a block diagram illustration of a multiple stage maser amplifier according to this invention.

FIG. 5 is a broken away section illustrating a side view of the maser amplifier of FIG. 4.

DESCRIPTION OF THE PREFERRED EMBODIMENTS

Figure 4:
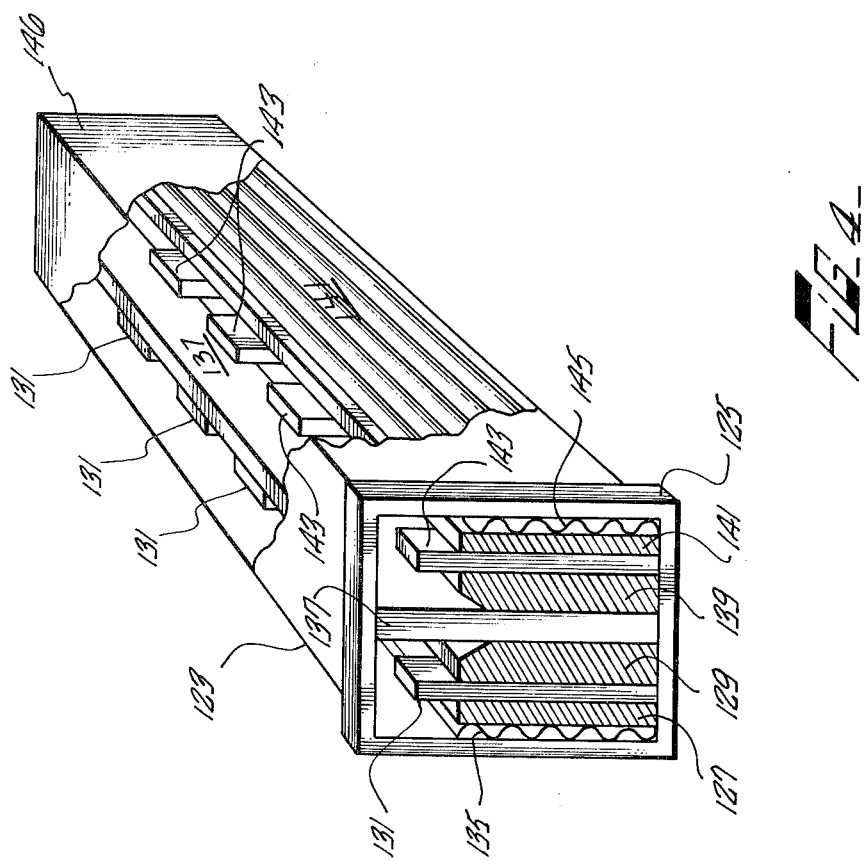
FIG. 4 is a perspective view, partially broken away, of a waveguide containing a slow-wave maser structure therein.

A multiple stage reflected-wave maser amplifier 11 (FIG. 2), that exhibits characteristics of a wide instantaneous bandwidth, in the range of 300 MHz, with an overall gain of approximately 45 dB, has as its basic element a two-direction slow-wave structure.

The first stage of the maser amplifier 11, comprises a three port circulator 15 connected to a waveguide 17 having a slow-wave structure 21 therein. A microwave signal 25 to be amplified is applied to the input port 13 of the number 1 circulator 15 which routes the input signal into the slow-wave structure 21 in the direction indicated by arrow 27. The slow-wave structure 21 is illustrated as being a ruby crystal completely filling a portion of the waveguide 17. The taper 19 of the ruby crystal is adjusted to match the impedance of the waveguide 17 to the slow-wave structure 21. The microwave signal traverses the slow-wave structure 21 and is amplified as a consequence of maser action.

At the other end 23 of the slow-wave structure 21, the traveling wave 29 is reflected and travels back through the slow-wave structure 21. This second traverse causes the signal to be amplified a second time. To better understand the significance of the foregoing statement consider the following. The power in a wave traveling through a slow-wave structure in a maser increases with the distance traversed (Z) as $e^{2\alpha_m Z}$, where $\alpha_m$ is the gain coefficient. Reflection of the amplified wave, so that it traverses the structure a second time, increases the power gain as $e^{2\alpha_m 2Z}$. The effectively doubled structure length (2Z) appears in the exponent of e and it follows that the (power) amplification factor of a reflected-wave maser is squared with respect to the amplification factor of a conventional traveling wave maser. The following examples are given to clarify, and emphasize, the improvement:

1. a slow-wave structure (of fixed length) amplifies a wave traveling through the structure by a factor of 10 (10dB). Reflection of this wave causes a second traverse, amplifying the wave a second time, multiplying the first amplification factor of 10 by 10. An overall amplification factor of 100 (20dB) is achieved.

2. When two stages are used, each having a gain factor of 10 on a single pass, the overall gain achieved by the reflected-wave maser is 10,000 ($10^4$ or 40dB).

Reflection of the traveling wave occurs because of the impedance mismatch between the end 23 of the first stage pump waveguide and the slow-wave structure 21. This is a phenomenon that is well known in the art. The twice amplified microwave signal 31 passes into the number 1 circulator 15 where it is routed into the output waveguide 35. This output waveguide is connected to a unidirectional isolator 37 which may be of the ferrite type, for example. This isolator couples the output energy from the number 1 circulator 15 into the second stage circulator 43.

The number 2 circulator 43 receives its input signal 41 and routes it into the maser waveguide 45 in a direction indicated by arrow 55. The energy traverses slow-wave structure 49 which may be identical to the slow-wave structure 21 of the first stage. The tapered configuration 47 of the ruby utilized in the slow-wave structure, again being for the purpose of impedance matching the waveguide 45 to the slow-wave structure 49. The traveling wave, as it reaches the other end 51 of the second stage slow-wave structure 49, is reflected in a direction indicated by arrow 53. As a consequence, it travels back through the slow-wave structure 49 and is amplified again. The signal 57 entering the number 2 circulator 43 of the second stage has now been amplified four times (gain of one pass raised to the fourth power) with respect to the input signal 25, received by the number 1 circulator 15. The number 2 circulator 43 routes this signal to its output waveguide 59 which may be coupled by way of a unidirectional isolator (not shown) to a subsequent similar stage.

The third stage of the maser amplifier 11 by way of dashed line 60 is meant to illustrate any convenient number of subsequent stages. The number of stages utilized will be determined by the gain versus bandwidth characteristic desired for the overall maser amplifier 11. The final stage will receive an input signal 61 at its number N circulator 63. This signal is routed into the waveguide 65 and the slow wave structure 69 and is amplified. At the other end 75 of the slow-wave structure 69, the signal 71 is reflected back through the slow-wave structure 69 and into the number N circulator 63. The signal 73 entering the number N circulator 63 has been amplified a factor that is equal to twice the number of stages in the overall amplifier (gain of one pass raised to the 2N power). The number N circulator 63 routes this signal to its output waveguide 79 that is connected to a utilization device (not shown).

The maser material utilized in the slow-wave structures of the stages of the maser amplifier 11 may be ruby crystal or any other suitable maser material. In case of the utilization of ruby maser material, the slow-wave structure of each stage of the maser amplifier 11 is cooled to approximately 4.5 Kelvin.

An appropriate source of pumping energy 81 may be connected to the stages of the maser amplifier 11 at the end of the respective waveguides that cause the traveling energy wave to be reflected back through the slow-wave structure. This is by no means the only effective way of coupling pumping energy to a traveling wave maser mechanism. It should also be understood that a single pumping energy source need not necessarily be used. Each stage of the multiple stage maser amplifier 11 may have its own source of pumping energy. Or, several stages may share a single source of pumping energy.

A super-conducting or Alnico magnet for example, having a north pole 83 and a south pole 85 located on opposite sides of the multiple stage maser amplifier 11 supplies the magnetic field for the maser amplifier. The pole faces of the magnet 83, 85 are shown as skewed with respect to each other. This causes the magnetic field 87 to 89 to be nonuniform across the slow-wave structures 21, 49, 69 of the stages in the maser amplifier. The degree of nonuniformity of the magnetic field 87–89 across the slow-wave structure of the various stages determines the degree of instantaneous bandwidth and gain of each stage.

A new multi-junction cryogenically coolable wideband circulator 91 (FIG. 3) has recently become available in the marketplace. This particular circulator 91 is uniquely adaptable for use with a two stage reflected-wave maser amplifier of the type illustrated in FIG. 2. If two such circulators are utilized, then a four stage maser amplifier is possible, etc. The circulator 91 is uniquely suited for the above application because it has a very low insertion loss when cooled to 4.5 Kelvin. Wide bandwidth operation is possible with this circulator mechanism because high isolation is obtained across a 700 MHz bandwidth.

The circulator 91 has an input connector 93 that couples the signal to be amplified from a device such as an antenna, for example, to the first circulator junction 98 by way of input port 97. The arrows at this junction indicate the low loss signal direction. Thus, a signal coming in at port 97 would be directed to port 99 and the first stage of the maser amplifier 11 by way of connector 119. The reflected signal from the first amplifier stage enters the circulator junction 98 at port 99 and is directed to the output port 101 which is coupled to the second circulator junction 102. This circulator junction is arranged as a unidirectional isolator by having one port 103 terminated by a load element 105. The signal at input port 101 will, therefore, be directed to output port 107 which is connected to the third circulator junction 108. The signal at output port 107 will be directed to the second stage of the maser amplifier 11 (FIG. 2) through the circulator junction 108, the output port 109 and connector 121. The reflected signal from the amplifier will be received at port 109 and directed to output port 111 which is coupled to the fourth circulator junction 112. This circulator junction is again arranged to function as a unidirectional isolator by having port 113 terminated by a load element 115. The signal at input port 111 will be directed to output port 117 and output connector 95 which is connected to a utilization device, not shown.

Instead of the slow-wave structure illustrated in FIG. 2, a comb-like slow-wave structure may be utilized. A two stage comb-like slow-wave structure for a maser amplifier exhibiting wide bandwidth and high gain, is shown in FIG. 4. A waveguide 123 is divided by a wall 137 along its longitudinal axis. This facilitates the placement of two slow-wave structures within the waveguide 123. The first stage of amplification comprises a plurality of metallic fingers 143 with slabs of maser material 139, 141 placed on either side of the metallic fingers. A spring loading device 145 maintains the maser material slabs in position against the metal fingers and the base of the waveguide 123. Side 141 of the metallic fingers does not contain ferrite isolators, as is common in prior art single direction masers. A signal coupled into the waveguide 123 propagates down its longitudinal axis, is reflected at the other end 146 by an impedance mismatch and is propagated back to the first end 125.

Figure 3:
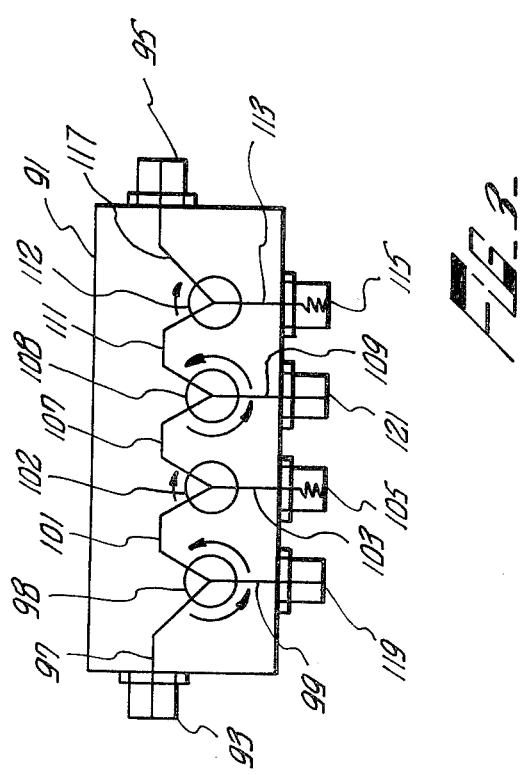
FIG. 3 is a block diagram illustration of a multiple circulator device that is conveniently utilizable with the maser amplifier of this invention.

The circulator mechanism 91 of FIG. 3 could be utilized in conjunction with the maser structure of FIG. 4 to provide a multi-stage amplifier. Connector 119 (FIG. 3) would be connected to the first stage of waveguide 123. Coupler 121 would be connected to the second stage of waveguide 123.

The second stage maser amplifier in waveguide 123 on the opposite side of the common wall 137, like the first stage, has a plurality of metallic fingers 131 with slabs of maser material 127, 129 on either side of such fingers. A spring loading device 135 keeps the slabs of material in close contact with the metallic fingers and with the base of the waveguide 123. It should be noted again that side 127 of this second stage does not utilize ferrite isolators thereby permitting the input signal to propagate down the longitudinal axis, be reflected by an impedance mismatch at the other end 146 and propagate back up, effectively doubling the amplifier length.

The electronic gain (dB) available per stage in the reflected-wave structure is given by the expression:

$$G = 2 \frac{(27.3 \; SNF)}{Qm}$$

Where:
$G$ = gain in dB
$S$ = slowing factor
$N$ = length of structure in free space wavelengths
$F$ = filling factor
$Qm$ = magnetic Q of the maser material A detailed discussion of slowing factor and measurement techniques can be found in the aforementioned book by A.E. Siegman, pages 331–341. Filling factor is defined and discussed in the same text pages 198, 254, 264 and 322.

The electronic gain (dB) for a single-direction prior art maser is given by:

$$G = \frac{27.3 \; SNF}{Qm}$$

The net gain for each stage is reduced by the losses in the slow-wave structure. A major area of loss in a single-direction maser is the ferrite isolator assembly in the slow wave structure. Since the two-direction maser of the present invention does not utilize such ferrite isolators, the net gain per stage will be that much higher.

In order to prevent each stage from oscillating, the input connector and circulator 91 (FIG. 2) and the slow-wave structure must be well matched and the gain per stage must be kept at a moderate value by the nonuniform magnetic field, as noted above.

Rather than using the waveguide 17 of FIG. 2, to couple signals into and out of the maser of this invention, the signals may be coupled from the circulator to the slow-wave structure by coaxial cables. A coaxial cable carrying a signal for amplification may be attached to the side of the waveguide 147 (FIG. 5) at point 149, for example. The wire within the coaxial cable 151 is then looped in close proximity to the first finger of the comb-like structure 157 and soldered to the base 153 of that structure. The maser material 155 is located on both sides of the comb-like structure. Pumping energy in this arrangement may be supplied from one end of the waveguide, in the direction indicated by the arrow 159.

Figure 6:
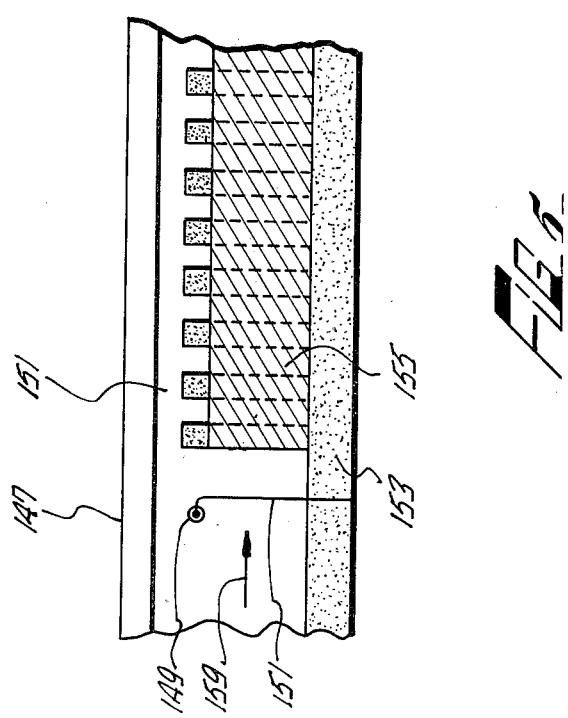
FIG. 6 is a block diagram illustrating a mechanism for creating a nonuniform magnetic field.

An alternate method for providing a nonuniform magnetic field across the slow-wave structure is that of placing a plurality of ferromagnetic material slabs within the pole faces of the magnet used to create the field. FIG. 6 illustrates a pair of north-south poles 161, 163 respectively having ferromagnetic (high permeability) material inserted between them. The lines of flux 165 that are distant from this ferromagnetic material are not affected by it.

The lines of flux 175 close to the ferromagnetic material 167 are drawn to it and concentrated by it. The lines of flux 181 close to the ferromagnetic material 171 are similarly affected. Similar action occurs with the ferromagnetic material 169, 173 and the lines of flux 179, 183. A slow-wave structure placed within this magnetic field will experience a variety of field strengths across its length from 165 to 186 thereby exhibiting the characteristics of a wide instantaneous bandwidth.

Figure 7:
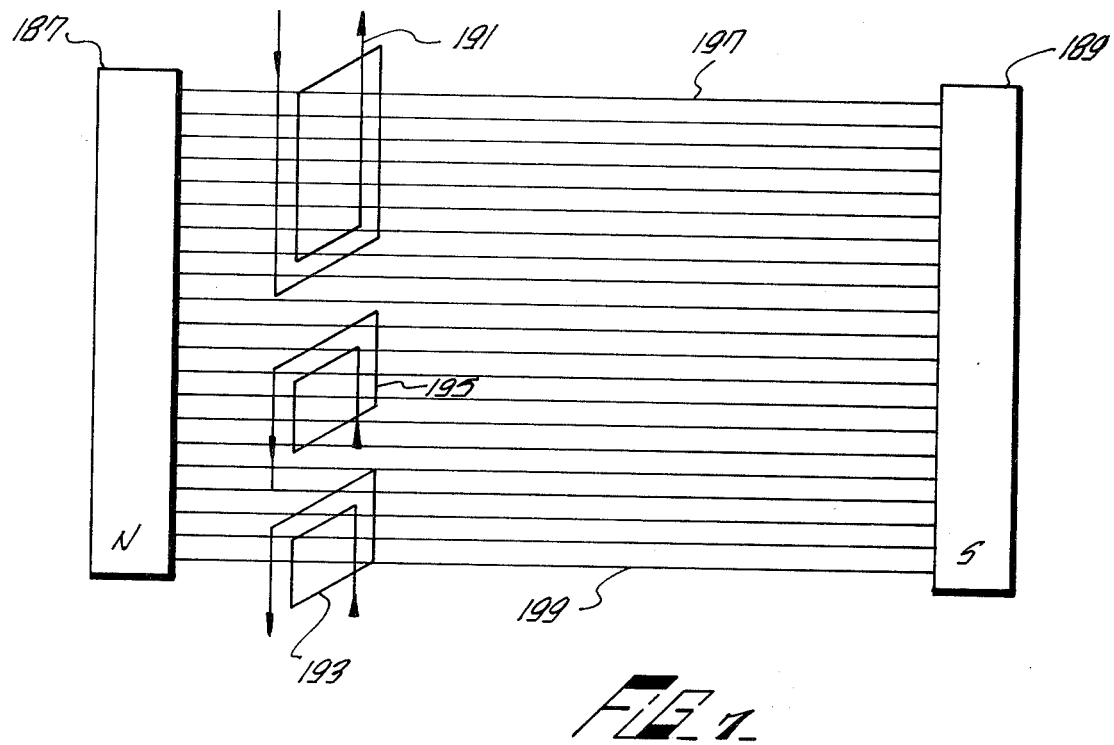
FIG. 7 is a block diagram illustrating an alternate mechanism for creating a nonuniform magnetic field.
Figure 6:
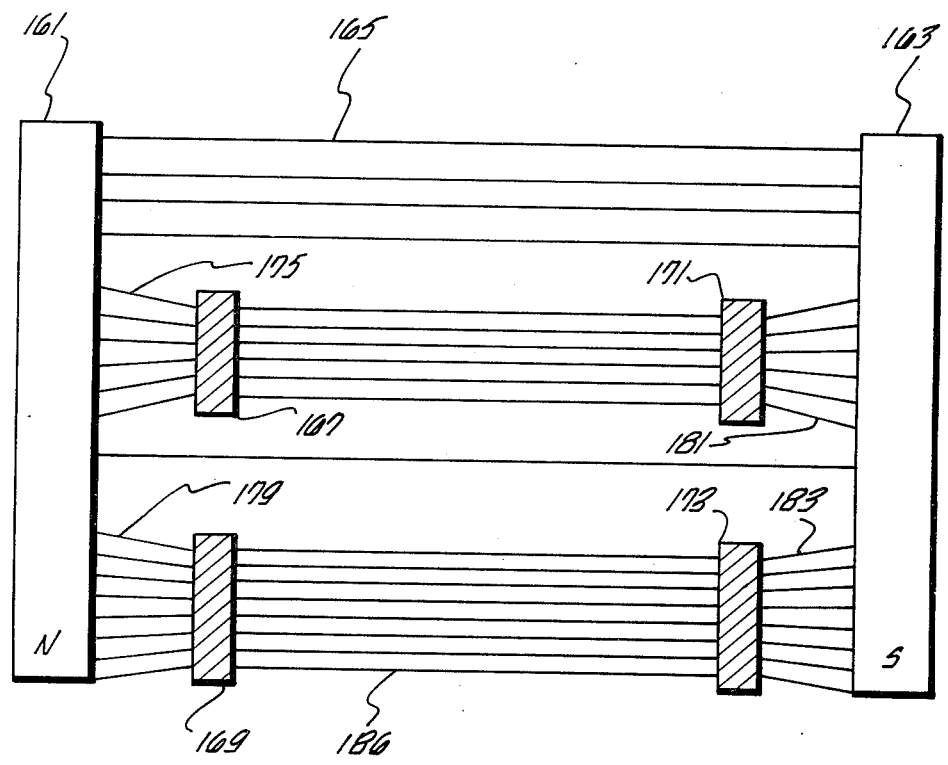

Instead of placing ferromagnetic material between the pole faces to obtain a nonuniform magnetic field, a more regulated nonuniform magnetic field may be obtained by placing current loops 191, 193 195 between the pole faces (FIG. 7). The north and south poles 187, 189 have faces that are parallel to each other. By varying the intensity and direction of current flow in the various current loops 191, 193 and 195 thereby aiding or negating the magnetic field between the pole faces, the uniformity of the magnetic field from 197 to 199 across a slow-wave structure can be varied at will.

Figure 8:
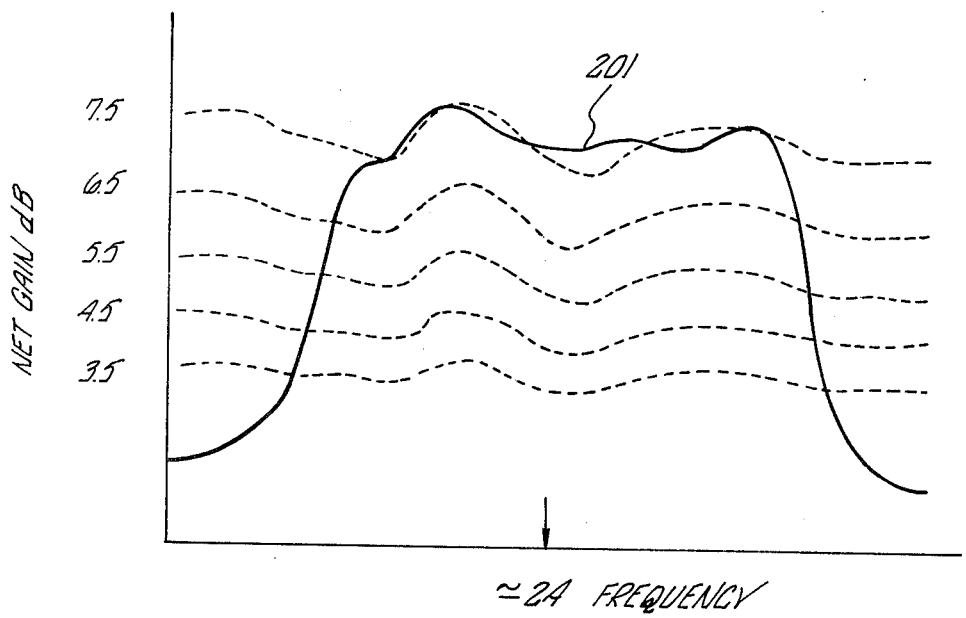
FIG. 8 is a graph illustrating the frequency response of a single stage of the maser of the present invention at 4.4 K.

An example of the bandwidth and gain characteristic of a single stage of the reflected-wave maser of FIG. 2 is shown in FIG. 8. The single stage maser was maintained at an operating temperature of 4.4 K during the test. A backward wave oscillator provided 50MW of pump energy distributed from 51.7 to 52.3 GHz. As can be seen from curve 201, the single stage maser had a net gain between 6½ and 7½ dB across a 300 MHz bandwidth centered at 24.6 GHz.

Figure 9:
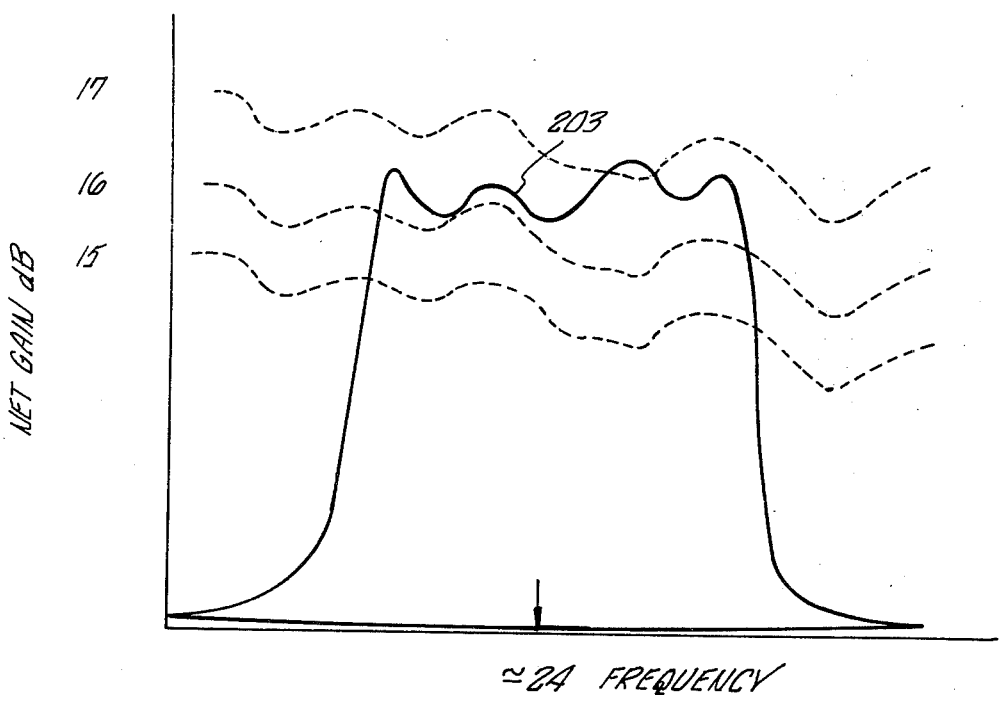
FIG. 9 is a graph illustrating the frequency response of a single stage of the maser of the present invention at 1.9 K.

The same maser amplifier was maintained at an operating temperature of 1.9 K and tested again. As can be seen from curve 203 (FIG. 9), the maser had a net gain between 16 and 17 dB (an amplification factor between 40 and 50) across a 235 MHz bandwidth.

In summary, what has been described is a two-direction reflected-wave maser that exhibits a net gain characteristic that is equivalent to a prior art traveling-wave maser of more than twice the length of the present invention. By cascading stages and immersing the slow-wave structures in a nonuniform magnetic field, a reflected-wave maser amplifier that has exceptionally wide bandwidth while maintaining a gain comparable to prior art traveling wave maser amplifiers is realized. Obviously, many modifications and variations of the present invention are possible in light of the above teachings. It should be understood that within the scope of the appended claims the invention may be practised otherwise than as specifically described.

What is claimed is:

1. A traveling-wave maser, comprising:
    a waveguide means having first and second ends, the second end of said waveguide means reflecting the traveling-wave signals traveling towards it;
    a slow-wave maser structure located in said waveguide means between said first and second ends; and
    means for introducing signals into and removing signal from said waveguide means at said first end.

2. The maser of claim 1 further comprising: means for supplying pumping energy to said slow-wave maser structure through the second end of said waveguide means.

3. The maser of claim 1 wherein said slow-wave structure comprises: a solid piece of ruby crystal filling the waveguide means along a portion of its length between the first and seconds ends.

4. The maser of claim 1 wherein said slow-wave structure comprises: a comb-type structure disposed between two slabs of maser material, said slow-wave structure permitting wave propagation in both directions along said waveguide.

5. The maser of claim 1 wherein said means for introducing and removing signals from said waveguide means comprises:
    a wideband circulator coupled to the first end of said waveguide means.

6. a traveling wave maser, comprising:
    a waveguide means having first and second ends, the second end of said waveguide means reflecting substantially all signals traveling towards it;
    a slow-wave maser structure located in said waveguide means between said first and second ends;
    means for introducing signals into and removing signals from said waveguide means at said first end; and
    means for maintaining a nonuniform magnetic field across said slow-wave maser structure.

7. The maser of claim 6 further comprising: means for supplying pumping energy to said slow-wave maser structure through the second end of said waveguide means.

8. The maser of claim 6 wherein said slow-wave structure comprises: a solid piece of ruby crystal filling the waveguide means along a portion of its length between the first and second ends.

9. The maser of claim 6 wherein said slow-wave structure comprises: a comb-type structure disposed between two slabs of maser material, said slow-wave structure permitting wave propagation in both directions along said waveguide.

10. The maser of claim 6 wherein said means for introducing and removing signals from said waveguide means comprises:
a wideband circulator coupled to the first end of said waveguide means.

11. The maser of claim 6 wherein said means for maintaining a nonuniform magnetic field comprises: a pair of magnetic poles, one on either side of said slow-wave structure, with their pole faces tilted with respect to each other.

12. The maser of claim 6 wherein said means for maintaining a nonuniform magnetic field comprises:
a pair of magnetic poles, one on either side of said slow-wave structure, with their pole faces parallel; and
ferromagnetic material interposed between said magnetic poles.

13. The maser of claim 6 wherein said means for maintaining a nonuniform magnetic field comprises:
a pair of magnetic poles, one on either side of said slow-wave structure, with their pole faces parallel; and
a current carrying loop interposed between said magnetic poles.

14. A high-gain, wide-bandwidth traveling wave maser comprising:
a first stage traveling wave maser, including:
a first waveguide means having a first and second end, the second end of said waveguide means reflecting substantially all signals traveling towards it;
a first slow-wave structure located in said waveguide means between said first and second ends;
first means for introducing signals into and removing signals from said first waveguide means at said first end;
a second stage traveling wave maser, including:
a second waveguide means having a first and second end, the second end of said second waveguide means reflecting substantially all signals traveling towards it;
a second slow-wave structure located in said second waveguide means between said first and second ends;
second means for introducing signals into and removing signals from said second waveguide means at said first end; and
means for unidirectionally coupling said first and said second stage traveling wave masers.

15. The amplifier maser amplifier of claim 14 further comprising:
means for supplying pumping energy to said first and second slow-wave structure through the second end of said first and second waveguide means.

16. The amplifier maser amplifier of claim 14 wherein said first and second slow-wave structure comprises: a solid piece of ruby crystal filling its respective wave-guide for a certain distance along its length between the waveguides' first and second ends.

17. The amplifier maser amplifier of claim 14 wherein said first and second slow-wave structure comprises: a comb-like structure disposed between two slabs of maser material, said slow-wave structure permitting wave propagation in both directions along said waveguide.

18. The amplifier maser amplifier of claim 14 wherein said first means for introducing and removing signals from said first waveguide comprises: a first wideband circulator coupled to the first end of said first waveguide and to said coupling means; and wherein said second means for introducing and removing signals from said second waveguide, comprises: a second wideband circulator coupled to the first end of said second waveguide and to said coupling means.

19. The maser of claim 14 further comprising:
means for maintaining a nonuniform magnetic field across said first and second slow wave structure.

20. The maser of claim 19 wherein said means for maintaining a nonuniform magnetic field comprises:
a pair of magnetic poles, one on either side of said first and second stage, with their pole faces parallel; and
ferromagnetic material interposed between said magnetic poles.

21. The maser of claim 19 wherein said means for maintaining a nonuniform magnetic field comprises:
a pair of magnetic poles, one on either side of said first and second stage, with their pole faces parallel; and
a current carrying loop interposed between said magnetic poles.

22. The maser of claim 19 wherein said means for maintaining a nonuniform magnetic field comprises:
a pair of magnetic poles, one on either side of said first and second stage, with their pole faces tilted with respect to each other.

* * * * *